United States Patent
van Haag

(10) Patent No.: US 7,037,249 B2
(45) Date of Patent: May 2, 2006

(54) DEFLECTION CONTROLLED ROLL

(75) Inventor: Rolf van Haag, Kerken (DE)

(73) Assignee: Voith Paper Patent GmbH, Heidenheim (DE)

( * ) Notice: Subject to any disclaimer, the term of this patent is extended or adjusted under 35 U.S.C. 154(b) by 459 days.

(21) Appl. No.: 10/200,494

(22) Filed: Jul. 23, 2002

(65) Prior Publication Data

US 2003/0022774 A1 Jan. 30, 2003

(30) Foreign Application Priority Data

Jul. 25, 2001 (DE) .......................... 101 36 271

(51) Int. Cl.
*B21B 21/02* (2006.01)

(52) U.S. Cl. ............................................. 492/2; 29/895
(58) Field of Classification Search .............. 29/895; 492/27, 7, 5
See application file for complete search history.

(56) References Cited

U.S. PATENT DOCUMENTS

| | | | |
|---|---|---|---|
| 3,802,044 A | | 4/1974 | Spillmann et al. |
| 3,932,921 A | * | 1/1976 | Biondetti ........................ 492/7 |
| 4,007,522 A | * | 2/1977 | Hold et al. ..................... 492/7 |
| 4,035,038 A | * | 7/1977 | Hinchcliffe et al. ......... 384/117 |
| 4,091,517 A | * | 5/1978 | Lehmann et al. .............. 492/5 |
| 4,852,229 A | * | 8/1989 | Crouse .......................... 492/7 |
| 4,941,250 A | * | 7/1990 | Kusters ....................... 492/16 |
| 5,084,137 A | * | 1/1992 | Ilmarinen et al. ........... 162/272 |
| 5,101,544 A | | 4/1992 | Kubik |
| 5,206,978 A | * | 5/1993 | Pav ............................... 492/7 |
| 5,208,956 A | * | 5/1993 | Wenzel et al. ................ 492/7 |

FOREIGN PATENT DOCUMENTS

| | | |
|---|---|---|
| DE | 2230139 | 1/1973 |
| DE | 3835152 | 4/1990 |
| DE | 19600078 | 7/1997 |
| EP | 0328503 | 8/1989 |

* cited by examiner

*Primary Examiner*—David P. Bryant
*Assistant Examiner*—Stephen Kenny
(74) *Attorney, Agent, or Firm*—Greenblum & Bernstein, P.L.C.

(57) ABSTRACT

Deflection controlled roll that includes a rotating roll jacket, a rotationally fixed yoke arranged to axially pass through the roll jacket, and a plurality of hydrostatic support elements arranged in series on the yoke in the direction of a roll axis which are chargeable with a pressure fluid to exert a supporting force on an inner side of the roll jacket. The plurality of hydrostatic support elements include hydrostatic pockets and at least one restrictor or capillary structured and arranged to supply pressure fluid to each of the hydrostatic pockets. A volume flow of at least some of the pressure fluid supplied to a respective hydrostatic pocket is variable depending upon a pressure on its respective hydrostatic support element.

25 Claims, 6 Drawing Sheets

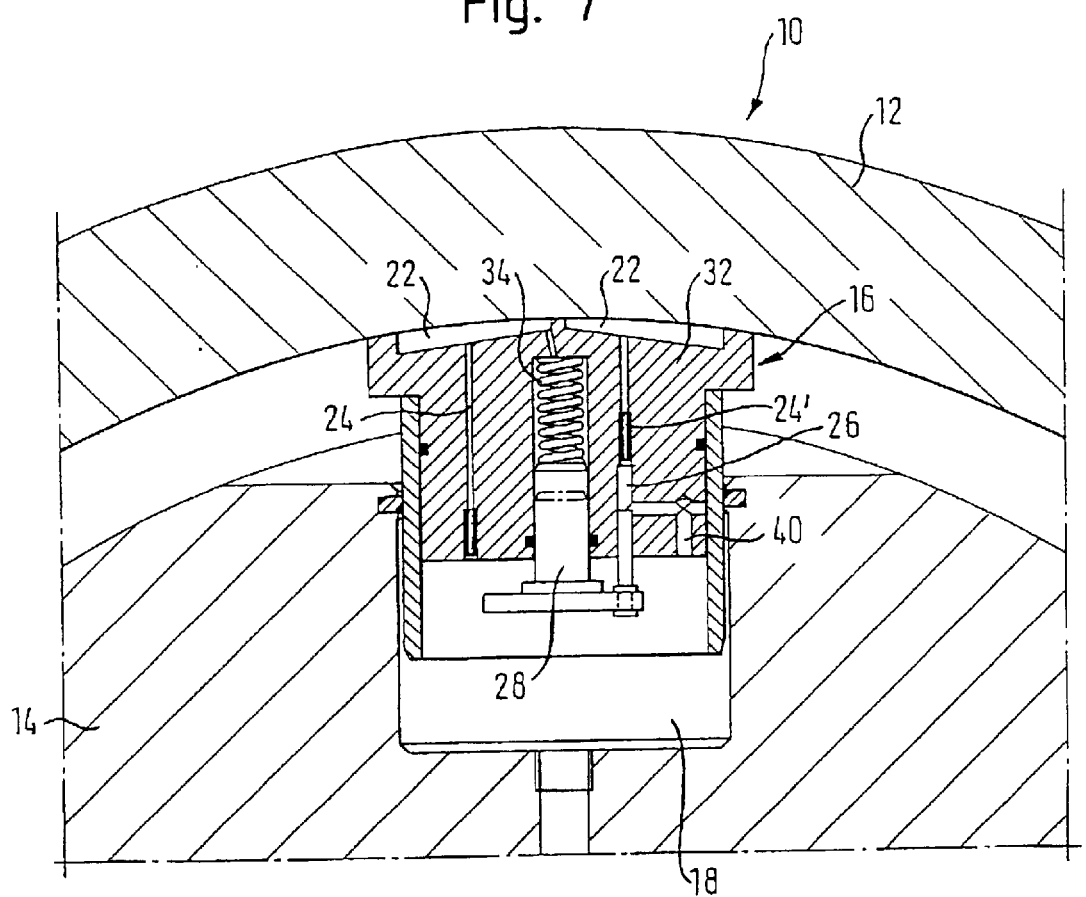
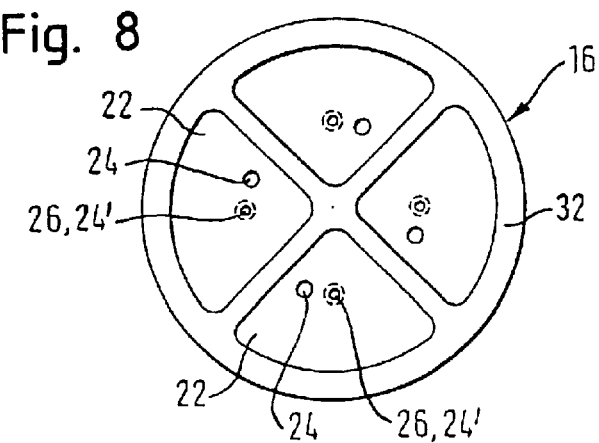

DEFLECTION CONTROLLED ROLL

CROSS-REFERENCE TO RELATED APPLICATIONS

The present application claims priority under 35 U.S.C. § 119 of German Patent Application No. 101 36 271.4 filed Jul. 25, 2001, the disclosure of which is expressly incorporated by reference herein in its entirety.

BACKGROUND OF THE INVENTION

1. Field of the Invention

The invention relates to a deflection controlled roll including a rotating roll jacket, a rotationally fixed yoke axially passing through the roll jacket, and a plurality of hydrostatic support elements arranged in series on the yoke in the direction of the roll axis, which are each formed by a piston in cylinder unit actuated by pressure fluid to exert a supporting force on the inner side of the roll jacket. The hydrostatic pockets of the hydrostatic support elements are each supplied with pressure fluid via at least one restrictor or capillary. Such a roll is described, for example, in EP-B-0 328 503.

2. Discussion of Background Information

In deflection controlled rolls or deflection compensation rolls, support sources or support elements are used which are charged with oil pressure through a supply line. The respective support source is pressed toward the rotating roll jacket by this oil pressure. Since the piston surface of the support source is smaller than the hydrostatic pocket surface facing the roll jacket, a lower pocket oil pressure is adopted. The pressure difference between the piston pressure and the pocket pressure defines the volume flow which flows via the capillaries disposed between the pocket surface and the piston surface. The respective volume flow is thus adopted at a support source in dependence on the piston pressure.

The support sources are individually charged with an oil pressure for an individual profile correction, i.e. in particular for the correction of certain transverse property profiles of the goods web, in particular of a paper web or of a cardboard web, running through the roll nip. The level of the oil pressures is regulated via an online profile thickness measurement of the goods web.

Large differences can occur between the oil pressures of the different support sources (e.g. from 3.5 to 90 bar from support source to support source) in dependence on the respectively required profile corrections. As already indicated, this results in volume flow differences at the support sources. Friction occurs between the rotating roll jacket and the support sources due to the oil shear in dependence on the jacket speed and to the oil gap level, which is in turn dependent on the volume flow, on the oil temperature and on the pocket pressure. A friction level thus results with a different amount from one support source to the other as a consequence of the large pressure differences and is expressed in temperature differences at the roll jacket. These temperature differences in turn have an effect on the shape of the roll jacket and thus also produce a feedback effect which influences the produced path load profile of the deflection controlled roll.

Since a lower volume flow is adopted with a pressure balance at a support source, a higher temperature results at this support source despite an operationally lower friction level than with higher pressures. However, a higher temperature now results in an expansion of the roll jacket which is expressed in a path load increase in the roll nip. Therefore, the temperature development is expressed in the reverse direction to the desired pressure balance and is thus unwanted. In individual cases, this can even result in instability in the control behavior.

Usually, the temperature development at the support sources is limited by a separate cooling oil flow which is led into the inner space of the roll. For this purpose, a volume flow of lower temperature is distributed in the inner space of the roll via nozzles, the amount of said volume flow being controlled via the return temperature of the roll. Up to now, the same amount of cooling oil is supplied to each support source by such a distribution. However, as a consequence of the previously named volume flow differences, different temperatures are adopted at the support sources despite the supplied cooling oil amount. This state of affairs is documented by the following calculation example:

The present calculation example is a deflection compensation roll of a thickness calender, with the production speed amounting to 1540 m/min. The surface temperature of the roll is, in this case, equal to the return temperature so that no heat flow flows through the jacket.

The technical data relevant to the calculation are as follows:

| | |
|---|---|
| outer diameter: | 1016 mm |
| inner diameter: | 780 mm |
| support source size: | 70 mm piston diameter |
| oil viscosity: | ISO VG 68 (mineral oil) |
| inlet temperature: | 40° C. for all flows (support source and cooling oil). |

The temperature development and the friction level of a support source were examined in the calculation for a minimum (3.5 bar) and a maximum (90 bar) possible piston pressure in dependence on the cooling flow.

FIG. 1 shows a diagram in which the respective oil temperature resulting after a support source is shown over the secondary flow, i.e., the cooling flow, for the minimum and the maximum piston pressure of 3.5 bar and 90 bar respectively. In this connection, the temperature is given in ° C. and the secondary flow in ltr./min. The oil temperature shown was determined directly in the outlet in the direction of jacket rotation behind the support source.

In the inlet of the support source, oil is taken in underneath the support source with the running of the roll jacket at a mixing temperature which results from the injection of the cooling oil into the interior of the roll.

It can be recognized from FIG. 1 that the oil temperatures are much higher for all examined cooling oil flows at a piston pressure of 3.5 bar than at a piston pressure of 90 bar.

The mixing temperature adopted at the interior of the roll approximately corresponds to the local return temperature. FIG. 2 shows a diagram in which the calculated return temperature is entered over the cooling flow (secondary flow) in each case for the two different piston pressures. In this connection, it must be noted that in each case only one support source was examined in the calculation, i.e. a mixing of the oil from a plurality of support sources with different oil pressures and thus different temperatures remains unconsidered.

The adopted local return temperatures show an increasing temperature difference between a support source with a high load and a support source with a low load as the cooling flows become smaller. Such a temperature difference, however, now has a decisive effect on the shape of the rotating roll jacket.

SUMMARY OF THE INVENTION

The present invention provides an improved deflection controlled roll of the kind initially mentioned in which the above-mentioned problems have been eliminated.

The instant invention includes a volume flow of at least some of the pressure fluid supplied to a respective hydrostatic pocket is variable in dependence on the piston pressure of the respective support element. In this connection, the volume flow is preferably variable such that an at least substantially constant mixing temperature results at the interior of the roll.

In a preferred practical embodiment of the deflection controlled roll in accordance with the invention, the volume flow is variable via at least one variable restrictor in dependence on the piston pressure of the respective support element.

The hydrostatic pockets can in particular be supplied via the pressure space of the respective support element, which means that the restrictors or capillaries are provided between this pressure space and the relevant hydrostatic pockets. Thus, a respective variable restrictor can be disposed between the pressure space of the relevant support element and the associated hydrostatic pocket.

The variable restrictor can in particular include a valve or be formed by a valve.

In a preferred practical embodiment, the variable restrictor is designed such that the relevant volume flow becomes increasingly larger as the piston pressures become increasingly smaller and vice versa. The mixing temperature at the interior of the roll can thus be kept at least substantially constant by a corresponding control of the variable restrictors.

Each support element is advantageously respectively supplied with at least one variable restrictor.

A respective hydrostatic pocket can be supplied with pressure fluid both via at least one fixed restrictor or non-variable capillary and via at least one variable restrictor to increase operational reliability.

The usual fixed restrictor or capillary can thus serve for the constant supply of a respective hydrostatic pocket. This can in particular be designed such that the hydrostatic pocket also functions operationally reliably at all pressures with a closed internal valve (variable restrictor).

The variable restrictor is preferably controlled by the piston pressure.

In an expedient practical embodiment of the deflection controlled roll in accordance with the invention, the variable restrictor is designed and/or controllable such that it is at least substantially fully closed at piston pressures above a pre-settable upper limiting value and/or is at least substantially open at piston pressures below a pre-settable lower limiting value.

The variable restrictor can in particular be controlled by a control piston which is charged by the piston pressure and which is preferably guided in the respective support element. In this connection, the control piston is preferably spring-loaded and can be charged against the spring force by the piston pressure in the pressure space of the support element.

It is also of advantage for a fixed restrictor to be disposed in series with the variable restrictor. The variable restrictor effect of the valve, which preferably takes place via the opening path of a control piston, can be finely tuned by such a fixed or constant restrictor disposed in series.

A pre-restrictor can be provided between the variable restrictor and the pressure space of the respective support element to improve the oscillation behavior of the relevant unit.

The present invention is directed to a deflection controlled roll that includes a rotating roll jacket, a rotationally fixed yoke arranged to axially pass through the roll jacket, and a plurality of hydrostatic support elements arranged in series on the yoke in the direction of a roll axis which are chargeable with a pressure fluid to exert a supporting force on an inner side of the roll jacket. The plurality of hydrostatic support elements include hydrostatic pockets and at least one restrictor or capillary structured and arranged to supply pressure fluid to each of the hydrostatic pockets. A volume flow of at least some of the pressure fluid supplied to a respective hydrostatic pocket is variable depending upon a pressure on its respective hydrostatic support element.

According to a feature of the instant invention, the hydrostatic support elements can include piston in cylinder units, and the volume flow of the at least some of the pressure fluid supplied to the respective hydrostatic pocket may be variable depending upon a piston pressure on its respective hydrostatic support element.

In accordance with another feature, the volume flow can be variable so that an at least substantially constant mixing temperature occurs at an interior of the roll jacket.

Further, at least one variable restrictor can be structured and arranged to vary the volume flow depending upon a pressure on the respective hydrostatic support element. The variable restrictor may be positioned between the pressure space and the respective hydrostatic pocket. The variable restrictor can include a valve. Still further, the variable restrictor can be structured and arranged so that volume flow becomes increasingly larger as pressure on the respective hydrostatic support element becomes increasingly smaller and so that the volume flow becomes increasingly smaller as pressure on the respective hydrostatic support element becomes increasingly larger.

In accordance with still another feature of the present invention, the hydrostatic support elements can include piston in cylinder units, and the deflection compensation roll may further include at least one variable restrictor structured and arranged to vary the volume flow depending upon a piston pressure on the respective hydrostatic support element. The variable restrictor can be positioned between the pressure space and the respective hydrostatic pocket. Further, the variable restrictor may include a valve, and the variable restrictor can be structured and arranged so that volume flow becomes increasingly larger as piston pressure of the respective hydrostatic support element becomes increasingly smaller and so that the volume flow becomes increasingly smaller as piston pressure of the respective hydrostatic support element becomes increasingly larger.

Further, each hydrostatic support element may include at least one variable restrictor. The respective hydrostatic pocket can be supplied with pressure fluid via the at least one restrictor or capillary, which may include a fixed restrictor or a non-variable capillary, and via the at least one variable restrictor. The variable restrictor may be controlled by pressure on the respective hydrostatic support element. The variable restrictor may be structured and arranged to be at least one of substantially fully closed at a pressure on the respective hydrostatic support element above a pre-settable upper limiting value and at least substantially fully open at a pressure on the respective hydrostatic support element below a pre-settable lower limiting value. A control piston can be structured and arranged to control the variable restrictor in accordance with a pressure on the respective hydrostatic support element. Further, the control piston may be arranged to be spring loaded and guided in the respective hydrostatic support element, such that the pressure in the pressure space of the respective hydrostatic support element is charged against the spring.

Moreover, the hydrostatic support element can include a piston in cylinder unit and the variable restrictor can be controlled by piston pressure of the respective hydrostatic support element. The variable restrictor may be structured and arranged to be at least one of substantially fully closed at piston pressures above a pre-settable upper limiting value and at least substantially fully open at piston pressures below a pre-settable lower limiting value. Further, a control piston can be structured and arranged to control the variable restrictor in accordance with piston pressure of the respective hydrostatic support element. The control piston may be arranged to be spring loaded and guided in the respective hydrostatic support element, such that the piston pressure in the pressure space of the respective hydrostatic support element is charged against the spring.

In accordance with still another feature of the instant invention, the at least one restrictor or capillary may include a fixed restrictor is arranged in series with a variable restrictor.

In accordance with still yet another feature of the present invention, the at least one restrictor or capillary can include a variable restrictor and the deflection compensation roll may further include a pre-restrictor positioned between the variable restrictor and the pressure space of the respective hydrostatic support element.

The present invention is directed to a process for operating a deflection controlled roll that includes a rotating roll jacket, a rotationally fixed yoke arranged to axially pass through the roll jacket, and a plurality of hydrostatic support elements arranged in series on the yoke in the direction of a roll axis. The process includes supplying pressure fluid to charge the plurality of hydrostatic support elements to exert a supporting force on an inner side of the roll jacket, and variably supplying a volume flow of at least some the pressure fluid to hydrostatic pockets of a respective hydrostatic support element through at least one restrictor or capillary depending upon a pressure on its respective hydrostatic support element.

In accordance with yet another feature of the present invention, the hydrostatic support elements may include piston in cylinder units, and the volume flow of the at least some of the pressure fluid supplied to the respective hydrostatic pocket can be variable depending upon a piston pressure on its respective hydrostatic support element.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings and wherein:

FIG. 7 schematically illustrates a sectioned representation of a further embodiment of a deflection controlled roll in accordance with the invention in which a respective hydrostatic pocket is supplied both via a fixed restrictor and via a parallel variable restrictor;

FIG. 8 schematically illustrates a plan view of the support element depicted in FIG. 7;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
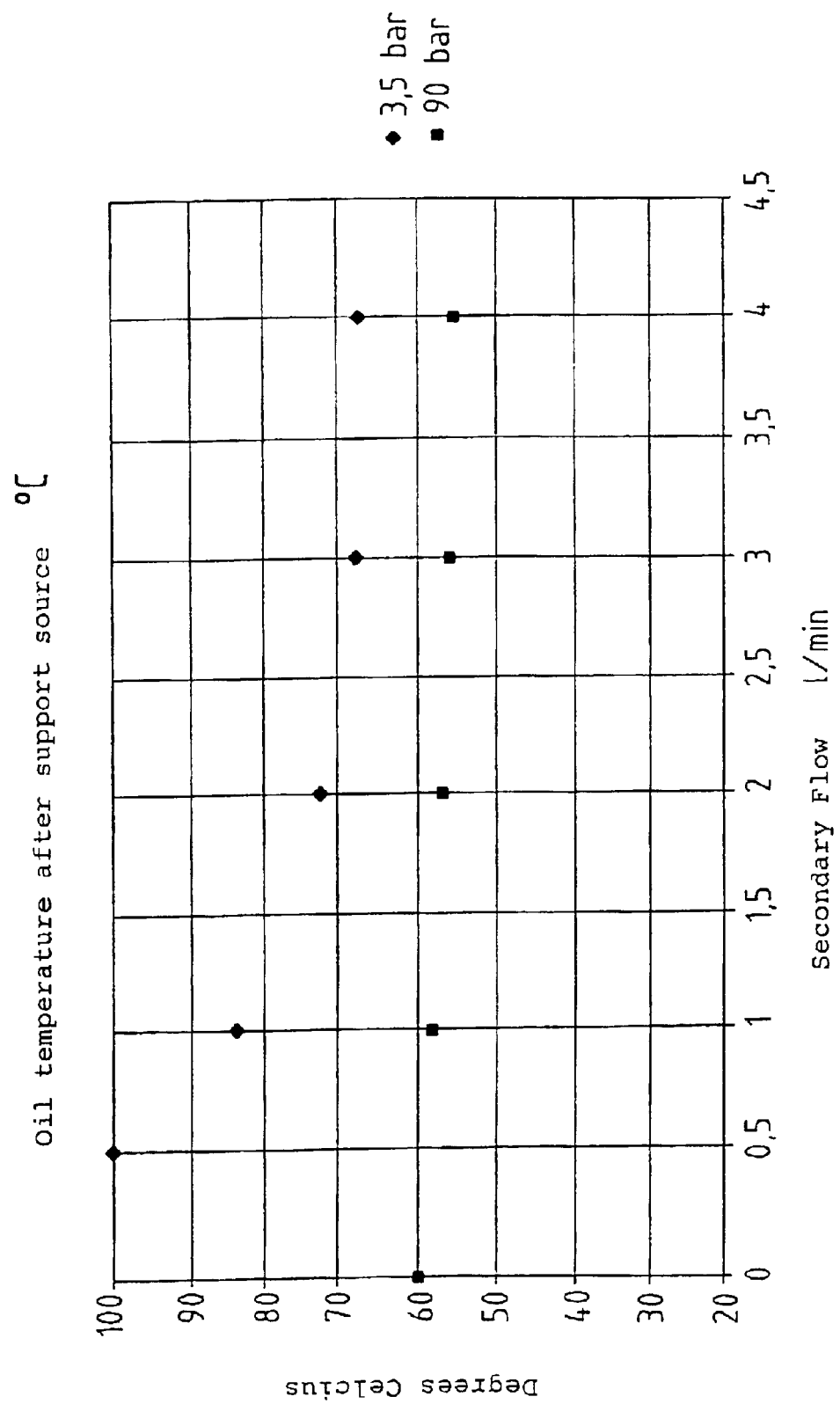
FIG. 1 illustrates respective oil temperatures resulting after a support source is shown for two different piston pressures over the cooling oil flow (secondary flow)
Figure 2:
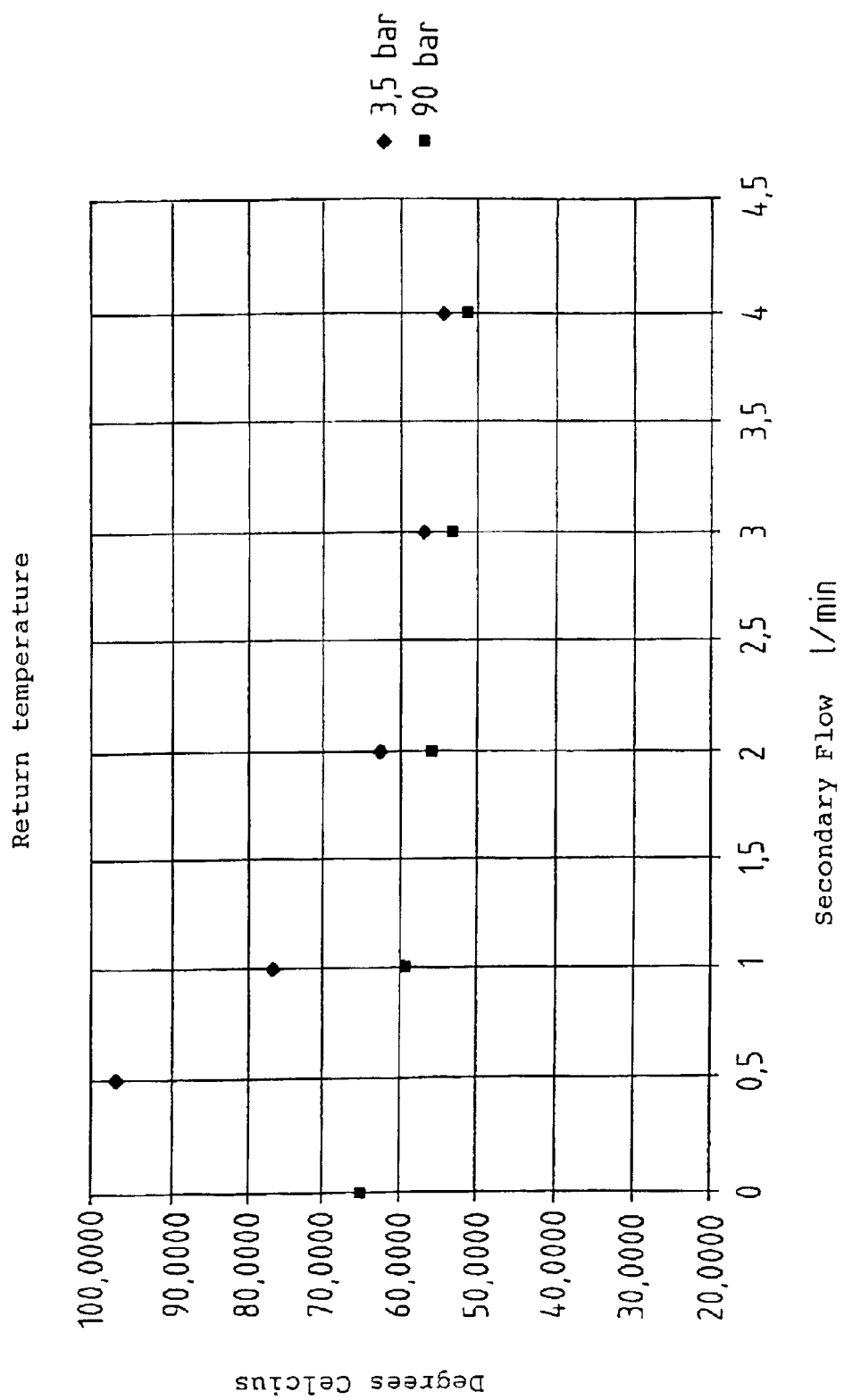
FIG. 2 illustrates respective calculated return temperatures for two different piston pressures over the cooling oil flow (secondary flow)
Figure 3:
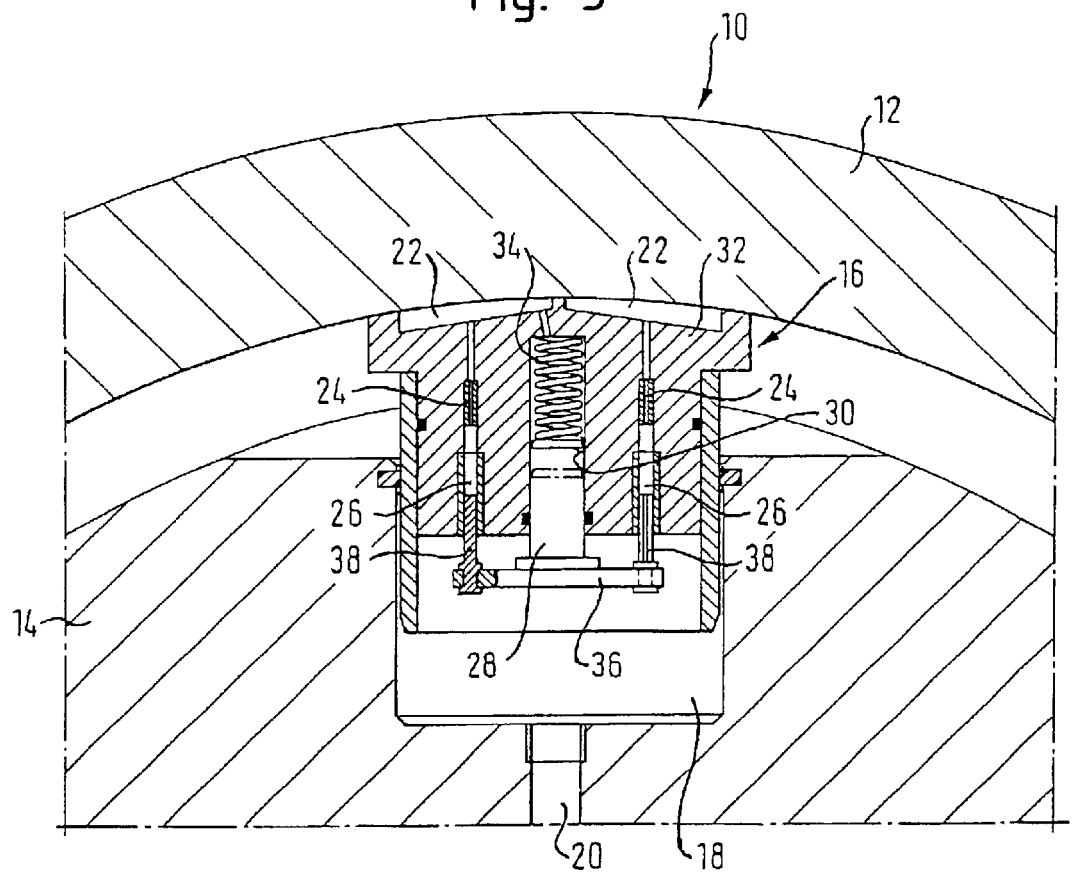
FIG. 3 schematically illustrates a sectioned representation of an embodiment of a deflection controlled roll in accordance with the invention in which the variable restrictors are each disposed in series with a fixed restrictor.

FIG. 3 shows, in a schematic sectioned part representation, an exemplary embodiment of a deflection controlled roll 10 in accordance with the invention which can serve for the treatment of a material web such as in particular of a paper web or of a cardboard web in a nip (not shown) formed with a counter surface.

The deflection controlled roll 10 includes a rotating roll jacket 12, a rotationally fixed yoke 14 axially passing through roll jacket 12 and a plurality of support elements 16 which are arranged in series on yoke 14 in the direction of the roll axis and of which only one can be recognized in FIG. 3.

Support elements 16 are each formed by a piston in cylinder unit actuated by pressure fluid and exerting a respective supporting force on the inner side of roll jacket 12.

Support elements 16 can be controlled individually and/or group-wise, whereby corresponding roll zones succeeding one another in the direction of the roll axis result.

Pressure space 18 of a respective support element 16 can be charged with pressure fluid via a passage 20 provided in yoke 14. Hydrostatic pockets 22 at the jacket side are each supplied with pressure fluid via at least one restrictor or capillary 24. In this connection, restrictors 24 are disposed in the present case between hydrostatic pockets 22 and pressure space 18.

In the present case, a respective support element 16 has, for example, four hydrostatic pockets 22 respectively.

The volume flow of the pressure fluid supplied to a restrictive hydrostatic pocket 22 is variable in accordance with the invention in dependence on the piston pressure prevailing in pressure space 18 of support element 16. In this connection, the relevant volume flows at the different support elements 16 are in particular variable such that an at least substantially constant mixing temperature results at the interior of the roll.

For this purpose, the respective volume flow is varied via a respective variable restrictor 26 in dependence on the piston pressure. As can be recognized with reference to FIG. 3, the variable restrictors 26 are disposed between the pressure space 18 and the respectively associated hydrostatic pocket 22.

Variable restrictors 26 can each include a valve or be made as a valve. In the present case, these valves are made such that the respective volume flow becomes increasingly larger as the piston pressures become increasingly smaller and vice versa.

In the present case, a respective fixed restrictor 24, i.e. non-variable capillary, opens into each hydrostatic pocket 22 and is disposed in series in each case with a variable restrictor 26 opening into pressure space 18 of support element 16.

Variable restrictors 26 are controlled by the piston pressure in pressure space 18. In this respect, variable restrictors 26 can, for example, be designed and/or controlled such that they are at least substantially closed at piston pressures above a pre-settable upper limiting value and/or at least substantially open at piston pressures below a pre-settable lower limiting value.

In the present case, variable restrictors 26 are controlled by a control piston 28 which is charged by the piston pressure and is guided in a recess 30 of piston 32 of support element 16. Control piston 28 is loaded in the direction of pressure space 18 by a spring 34 supported at the base of recess 30 and can be charged against the force of spring 34 by the piston pressure in pressure space 18 via an associated plate 36. Valve bodies 38 are connected to plate 36 and are moved in the closing direction or in the opening direction of valve-like variable restrictors 26 in accordance with the respective pressure charge.

Figure 4:
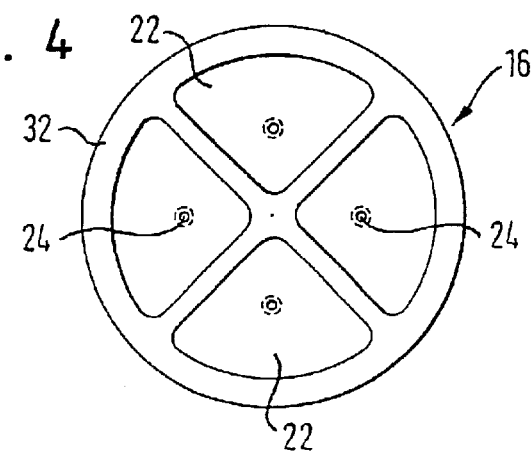
FIG. 4 schematically illustrates a plan view of the support element depicted in FIG. 3.

FIG. 4 shows a schematic plan view of support element 16 which can be recognized in FIG. 3. As can in particular be recognized with reference to this FIG. 4, support element 16 in the present case includes four hydrostatic pockets 22 into which a respective restrictor 24 opens.

Figure 5:
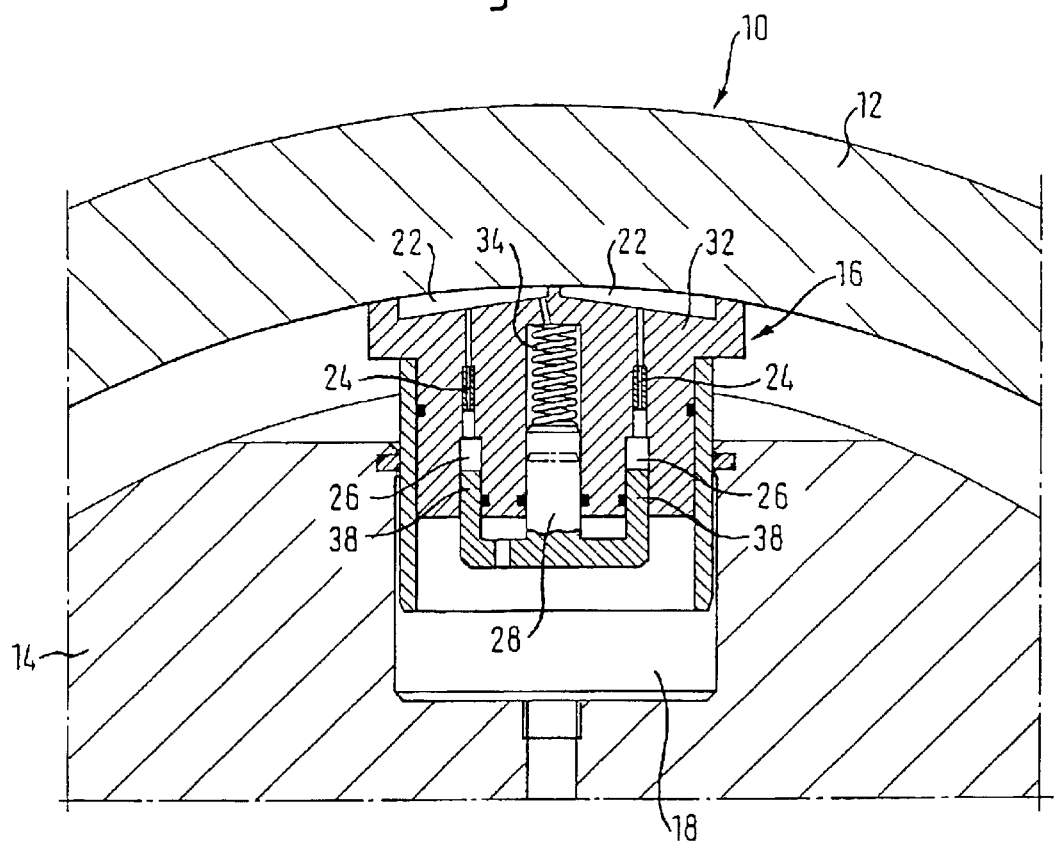
FIG. 5 schematically illustrates a sectioned representation of a further embodiment of a deflection controlled roll in accordance with the invention with variable restrictors and fixed restrictors disposed in series.
Figure 6:
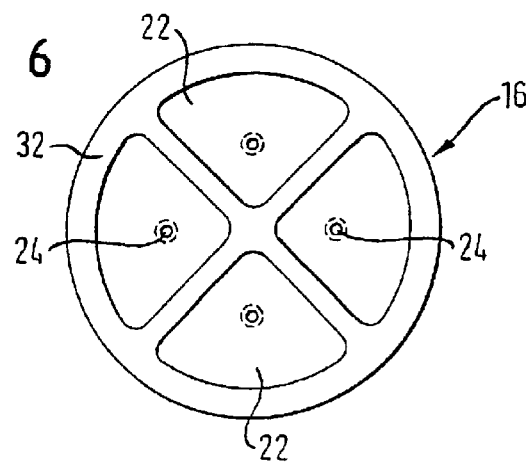
FIG. 6 schematically illustrates a plan view of the support element depicted in FIG. 5.

FIGS. 5 and 6 show in a schematic representation a further embodiment of a deflection controlled roll 10 in accordance with the invention with variable and fixed restrictors 26 and 24 respectively disposed in series.

In this case, valve bodies 38 associated with variable restrictors 26 are connected to control piston 28 in one piece.

In other respects, this embodiment can again, for example, have at least substantially the same design as the embodiment shown in FIGS. 3 and 4. Parts corresponding to one another are associated with the same reference numerals.

In the exemplary embodiments of a deflection controlled roll 10 in accordance with the invention shown in FIGS. 7 and 8, a respective hydrostatic pocket 22 is supplied with pressure fluid respectively both via a fixed restrictor 24, or non-variable capillaries, and via a parallel variable restrictor 26. As can be recognized with reference to FIG. 7, the variable restrictor 26 can again also be disposed in series with a fixed restrictor 24'.

Variable restrictor 26 can in particular again be designed and/or controlled such that it is at least substantially closed at piston pressures above a pre-settable upper limiting value and/or at least substantially open at piston pressures below a pre-settable lower limiting value. As can be recognized with reference to FIG. 7, variable restrictor 26 opens via a passage 40 in pressure space 18.

Variable restrictor 26 is again controlled via a spring-loaded control piston 28.

In other respects, this embodiment can again, for example, also have at least substantially the same design as the embodiment shown in FIGS. 3 and 4. Corresponding parts are associated with the same reference numerals.

Figure 9:
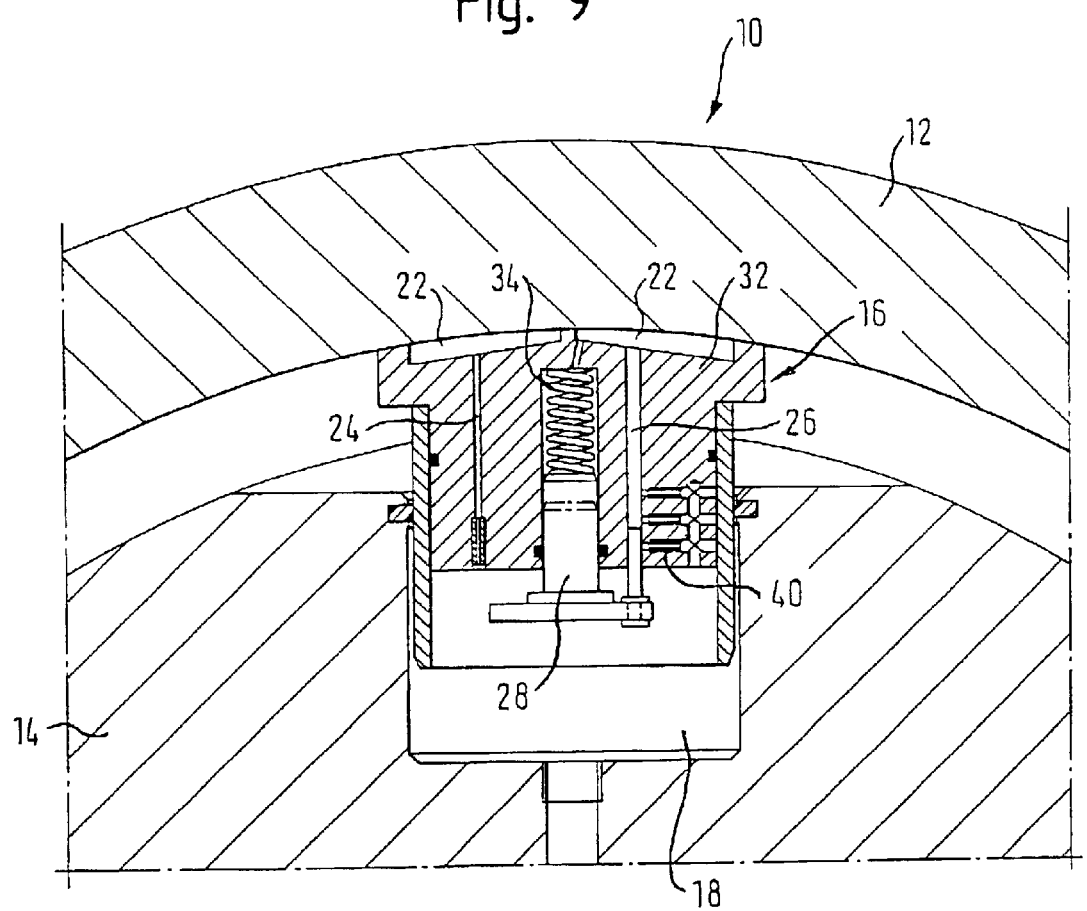
FIG. 9 schematically illustrates a sectioned representation of a further embodiment of an adjustment deflection roll in which a respective hydrostatic pocket is supplied both via a fixed restrictor and via a parallel variable restrictor.
Figure 10:
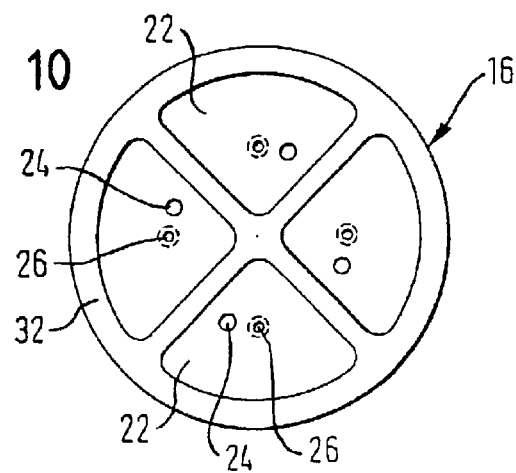
FIG. 10 schematically illustrates a plan view of the support element depicted in FIG. 9.

The embodiment shown in FIGS. 9 and 10 differs from that of FIGS. 7 and 8 initially in that variable restrictors 26 open directly into the respective hydrostatic pocket 22. Moreover, one or more respective pre-restrictors 40 are provided between a respective variable restrictor 26 and pressure space 18.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may have been made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE NUMERAL LIST 10 deflection controlled roll
12 roll jacket
14 yoke
16 support element
18 pressure space
20 passage
22 hydrostatic pocket
24 restrictor, capillary
24' restrictor, capillary
26 variable restrictor
28 control piston
30 recess
32 piston
34 spring, spring force
36 plate
38 valve body
40 pre-restrictor

What is claimed:

1. A deflection controlled roll comprising:

a rotating roll jacket;

a rotationally fixed yoke arranged to axially pass through said roll jacket;

a plurality of hydrostatic support elements arranged in series on the yoke in the direction of a roll axis which are chargeable with a pressure fluid to exert a supporting force on an inner side of said roll jacket;

said plurality of hydrostatic support elements comprising hydrostatic pockets and at least one restrictor or capillary structured and arranged to supply pressure fluid to each of said hydrostatic pockets, wherein a volume flow of at least some of the pressure fluid supplied to a respective hydrostatic pocket is variable depending upon a pressure on its respective hydrostatic support element.

2. The deflection compensation roll in accordance with claim 1, wherein said hydrostatic support elements comprise piston in cylinder units, and the volume flow of the at least some of the pressure fluid supplied to said respective hydrostatic pocket is variable depending upon a piston pressure on its respective hydrostatic support element.

3. The deflection compensation roll in accordance with claim 1, wherein the volume flow is variable so that an at least substantially constant mixing temperature occurs at an interior of said roll jacket.

4. The deflection compensation roll in accordance with claim 1, further comprising at least one variable restrictor structured and arranged to vary the volume flow depending upon a pressure on said respective hydrostatic support element.

5. The deflection compensation roll in accordance with claim 4, wherein said variable restrictor is positioned between said pressure space and said respective hydrostatic pocket.

6. The deflection compensation roll in accordance with claim 4, wherein said variable restrictor comprises a valve.

7. The deflection compensation roll in accordance with claim 4, wherein said variable restrictor is structured and arranged so that volume flow becomes increasingly larger as pressure on said respective hydrostatic support element becomes increasingly smaller and said volume flow becomes increasingly smaller as pressure on said respective hydrostatic support element becomes increasingly larger.

8. The deflection compensation roll in accordance with claim 1, wherein said hydrostatic support elements comprise piston in cylinder units, and said deflection compensation roll further comprises at least one variable restrictor structured and arranged to vary the volume flow depending upon a piston pressure on said respective hydrostatic support element.

9. The deflection compensation roll in accordance with claim 8, wherein said variable restrictor is positioned between said pressure space and said respective hydrostatic pocket.

10. The deflection compensation roll in accordance with claim 8, wherein said variable restrictor comprises a valve.

11. The deflection compensation roll in accordance with claim 8, wherein said variable restrictor is structured and arranged so that volume flow becomes increasingly larger as piston pressure of said respective hydrostatic support element becomes increasingly smaller and said volume flow becomes increasingly smaller as piston pressure of said respective hydrostatic support element becomes increasingly larger.

12. The deflection compensation roll in accordance with claim 1, wherein each hydrostatic support element comprises at least one variable restrictor.

13. The deflection compensation roll in accordance with claim 12, wherein said respective hydrostatic pocket is supplied with pressure fluid via said at least one restrictor or capillary, which comprises a fixed restrictor or a non-variable capillary, and via said at least one variable restrictor.

14. The deflection compensation roll in accordance with claim 13, wherein said variable restrictor is controlled by pressure on said respective hydrostatic support element.

15. The deflection compensation roll in accordance with claim 14, wherein said variable restrictor is structured and arranged to be at least one of substantially fully closed at a pressure on said respective hydrostatic support element above a pre-settable upper limiting value and at least substantially fully open at a pressure on said respective hydrostatic support element below a pre-settable lower limiting value.

16. The deflection compensation roll in accordance with claim 14, further comprising a control piston structured and arranged to control said variable restrictor in accordance with a pressure on said respective hydrostatic support element.

17. The deflection compensation roll in accordance with claim 16, wherein said control piston is arranged to be spring loaded and guided in said respective hydrostatic support element, such that the pressure in said pressure space of said respective hydrostatic support element is charged against said spring.

18. The deflection compensation roll in accordance with claim 1, wherein said hydrostatic support element comprises a piston in cylinder unit and said variable restrictor is controlled by piston pressure of said respective hydrostatic support element.

19. The deflection compensation roll in accordance with claim 18, wherein said variable restrictor is structured and arranged to be at least one of substantially fully closed at piston pressures above a pre-settable upper limiting value and at least substantially fully open at piston pressures below a pre-settable lower limiting value.

20. The deflection compensation roll in accordance with claim 19, further comprising a control piston structured and arranged to control said variable restrictor in accordance with piston pressure of said respective hydrostatic support element.

21. The deflection compensation roll in accordance with claim 20, wherein said control piston is arranged to be spring loaded and guided in said respective hydrostatic support element, such that the piston pressure in said pressure space of said respective hydrostatic support element is charged against said spring.

22. The deflection compensation roll in accordance with claim 1, wherein said at least one restrictor or capillary comprises a fixed restrictor is arranged in series with a variable restrictor.

23. The deflection compensation roll in accordance with claim 1, wherein said at least one restrictor or capillary comprises a variable restrictor and the deflection compensation roll further comprises a pre-restrictor positioned between said variable restrictor and said pressure space of said respective hydrostatic support element.

24. A process for operating a deflection controlled roll that includes a rotating roll jacket, a rotationally fixed yoke arranged to axially pass through the roll jacket, and a plurality of hydrostatic support elements arranged in series on the yoke in the direction of a roll axis, said process comprising:

supplying pressure fluid to charge the plurality of hydrostatic support elements to exert a supporting force on an inner side of the roll jacket;

variably supplying a volume flow of at least some of the pressure fluid to hydrostatic pockets of a respective hydrostatic support element through at least one restrictor or capillary depending upon a pressure on its respective hydrostatic support element.

25. The process in accordance with claim 24, wherein the hydrostatic support elements comprise piston in cylinder units, and the volume flow of the at least some of the pressure fluid supplied to the respective hydrostatic pocket is variable depending upon a piston pressure on its respective hydrostatic support element.

* * * * *